(12) United States Patent
Cogswell et al.

(10) Patent No.: US 12,344,084 B2
(45) Date of Patent: Jul. 1, 2025

(54) HARD TOP ROOF REMOVAL ASSIST

(71) Applicants: Magna Exteriors Inc., Concord (CA); Marc Cogswell, Bloomfield Hills, MI (US)

(72) Inventors: Marc Cogswell, Bloomfield Hills, MI (US); Larry R. Erickson, Birmingham, MI (US); Robert M. Horner, Ferndale, MI (US); Brian Staley, Bloomfield, MI (US); Luyao Zhu, Troy, MI (US)

(73) Assignee: Aurora Ontario (CA)

( * ) Notice: Subject to any disclaimer, the term of this patent is extended or adjusted under 35 U.S.C. 154(b) by 178 days.

(21) Appl. No.: 18/020,175

(22) PCT Filed: Aug. 30, 2021

(86) PCT No.: PCT/US2021/048185
§ 371 (c)(1),
(2) Date: Feb. 7, 2023

(87) PCT Pub. No.: WO2022/047287
PCT Pub. Date: Mar. 3, 2022

(65) Prior Publication Data
US 2023/0311626 A1    Oct. 5, 2023

Related U.S. Application Data

(60) Provisional application No. 63/071,408, filed on Aug. 28, 2020.

(51) Int. Cl.
| | |
|---|---|
| *B60J 7/10* | (2006.01) |
| *B60J 7/02* | (2006.01) |
| *B60J 7/19* | (2006.01) |
| *B62B 3/10* | (2006.01) |

(52) U.S. Cl.
CPC .............. *B60J 7/106* (2013.01); *B60J 7/026* (2013.01); *B60J 7/194* (2013.01); *B62B 3/10* (2013.01)

(58) Field of Classification Search
CPC ... B60J 7/106; B60J 7/026; B60J 7/102; B60J 7/11; B60J 7/194; B60J 7/198; B60J 7/041; B60J 7/0573; B60J 1/085; B62D 33/04
USPC ....... 296/102, 10, 103, 100.04, 100.05, 218, 296/193.03, 193.12, 99.1
See application file for complete search history.

(56) References Cited

U.S. PATENT DOCUMENTS 3,328,107 A * 6/1967 Gutner ................ A47B 88/483
384/22
3,773,380 A * 11/1973 Stockdill .................. B60J 7/041
296/16

(Continued)

FOREIGN PATENT DOCUMENTS

| | | | | |
|---|---|---|---|---|
| FR | 2597822 A1 | * | 10/1987 | |
| GB | 2555444 A | * | 5/2018 | .............. B60J 7/041 |

*Primary Examiner* — Amy R Weisberg
*Assistant Examiner* — Wenwei Zhuo
(74) *Attorney, Agent, or Firm* — Warn Partners, P.C.

(57) ABSTRACT

A hard top removal assist system for a vehicle. The system includes a vehicle body having a plurality of rails mounted to the vehicle body. A hard top has a connection that is used to connect the hard top to the plurality of rails. There is at least one connection on the hard top that is slidable in the one or more rails between an installed position and a removed position. The hard top can be fully removed from the vehicle body and the one or more rails.

13 Claims, 10 Drawing Sheets

(56) References Cited

U.S. PATENT DOCUMENTS

| | | | | |
|---|---|---|---|---|
| 3,817,413 A * | 6/1974 | Ham | B60P 1/6427 | 410/67 |
| 3,897,100 A * | 7/1975 | Gardner | B60J 7/041 | 296/156 |
| 3,901,548 A * | 8/1975 | Seaman, Jr. | B60J 7/062 | 296/100.18 |
| 3,923,334 A * | 12/1975 | Key | B60J 7/106 | 296/100.1 |
| 4,065,041 A * | 12/1977 | Stegavig | B60R 9/00 | 296/3 |
| 4,068,886 A * | 1/1978 | Gostomski | B62D 33/04 | 296/100.04 |
| 4,406,493 A * | 9/1983 | Albrecht | B60J 7/041 | 160/32 |
| 4,489,977 A * | 12/1984 | Earing, Jr. | B60P 3/42 | 296/183.1 |
| 4,648,649 A * | 3/1987 | Beal | B60P 3/42 | 296/156 |
| 4,693,508 A * | 9/1987 | Pettit | B60J 7/041 | 296/105 |
| 4,810,158 A * | 3/1989 | Bitzer | B60J 7/106 | 280/47.131 |
| 4,867,465 A * | 9/1989 | Dunchock | B62B 3/108 | D34/17 |
| 4,927,206 A * | 5/1990 | Murdock | B60J 7/106 | 296/156 |
| 4,953,910 A * | 9/1990 | Maekawa | B60J 7/026 | 296/223 |
| 5,067,766 A * | 11/1991 | Lovaas | B60J 7/041 | 296/220.01 |
| 5,305,774 A * | 4/1994 | Hager | B60P 7/10 | 296/156 |
| 5,383,702 A * | 1/1995 | Matheson | B63B 7/04 | 114/352 |
| 5,470,124 A * | 11/1995 | Ernst | B60J 7/022 | 296/100.04 |
| 5,486,031 A * | 1/1996 | Ronchetti | B60J 7/104 | 296/10 |
| 5,495,905 A * | 3/1996 | Fini, Jr. | B60G 9/00 | 180/382 |
| 5,516,182 A * | 5/1996 | Aragon | B60P 3/34 | 296/105 |
| 5,735,566 A * | 4/1998 | Bradley | B60J 7/08 | 296/100.17 |
| 10,822,010 B1 * | 11/2020 | Brown | B65D 61/02 | |
| 12,116,045 B1 * | 10/2024 | Schibler | B60R 16/03 | |
| 2008/0100089 A1 * | 5/2008 | Schumacher | B60J 7/106 | 296/107.17 |
| 2011/0316302 A1 * | 12/2011 | Lenz, Jr. | B60J 7/026 | 296/100.03 |
| 2016/0257535 A1 * | 9/2016 | Hall | B66C 23/48 | |
| 2017/0349037 A1 * | 12/2017 | Singer | B60J 7/041 | |

* cited by examiner

HARD TOP ROOF REMOVAL ASSIST

CROSS-REFERENCE TO RELATED APPLICATIONS

This application is a PCT International Application and claims benefit of U.S. Provisional Patent Application No. 63/071,408, filed Aug. 28, 2020. The disclosure of the above application is incorporated herein by reference.

FIELD OF THE INVENTION

The present invention relates to a hard top removal assist system for removing a vehicle hard top.

BACKGROUND OF THE INVENTION

Removable hard tops for vehicles have been common place in the automotive industry for decades. However, depending on the type of vehicle the process of removing the hard top can be very difficult and often can require several persons to remove the hard top, which is often bulky and very heavy. Examples of such tops include hard tops for a Jeep®, pickup truck cabs, boat tops, and vehicles with T-tops etc. Different systems have been developed over the years that include different lift systems that implement pulleys, powered winches, or other expensive equipment. Still many vehicle owners often forgo the expense and hassle of installing lift systems in the garages and elect to rely on manually removing the top, which can require multiple people to remove the top. It is an object of the invention to provide a system that allows the hard top to easily connect to and be held to the vehicle, but also allow the hard top to selectively slide off the vehicle to a removed position that allows the user to handle more easily the hard top. It is further an object of the invention to provide an inexpensive system that enables removal of the hard top by using a rolling cart that is either custom designed for a specific top or is a generic cart that the hard top is loaded onto.

SUMMARY OF THE INVENTION

The present invention is directed to a hard top removal assist system for a vehicle. The system includes a vehicle body has a plurality of rails mounted to the vehicle body. A hard top is connected to the rails using a connection that is slidable in respective plurality of rails between an installed position and a removed position. The hard top can be fully removed from the vehicle body and the one or more rails.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
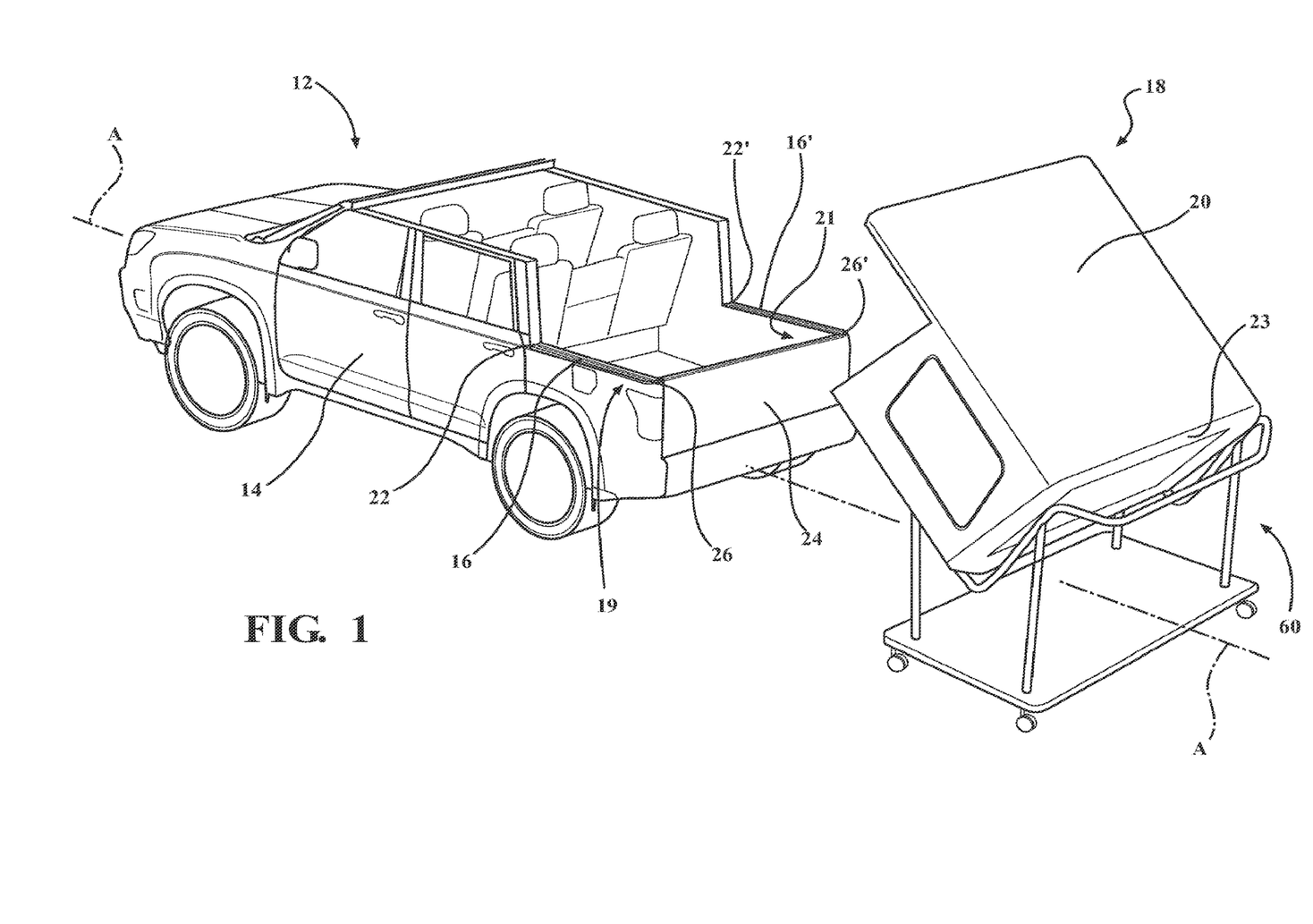
FIG. 1 a perspective view of a hard top vehicle removal system according to one embodiment of the present invention.

Referring now to FIG. 1 a hard top removal assist system 10 for a vehicle 12 is shown. The vehicle 12 includes a vehicle body 14 having rails 16, 16' mounted to the vehicle body 14. As shown in FIG. 1 there are two rails, with rail 16 mounted to a left side top rear quarter 19 and rail 16' mounted to a right side top rear quarter 21 of the vehicle body 14. The rails 16, 16' extend parallel to a longitudinal axis A-A of the vehicle 12. The rails 16, 16' can take many forms as discussed below with respect to the different embodiments of the invention. Rails 16, 16' each have a respective first end 22, 22' spaced away at a distance from a rear side 24 of the vehicle 12 and a second end 26, 26' of the rails 16, 16' is positioned at the rear side 24 of the vehicle 12 opposite the respective first end 22, 22'.

Referring now to FIGS. 1-4 a hard top 18 is removably connected to the vehicle body 14 using the rails 16, 16' and a connection which in the present embodiment of the invention are dog posts 28, 28', 34, 34'. The hard top 18 has a left side 27 with the two dog posts 28, 28' extending past a bottom edge 30. The hard top 18 also has a right side 32 with the two dog posts 34, 34' extending past a bottom edge 36. The hard top 18 can be a single piece and includes a roof 20 and rear side 23, in addition to the left side 27 and right side 32, all connected together or integrally formed as a single piece. FIG. 3B shows some of the details of the rails 16, 16' each of which has a channel 38 with a wide aperture portion 40 and a narrow aperture portion 42. The wide aperture portion 40 extends from an open end 44 that is located at the second end 26, 26' of the respective one of the rails 16, 16'. The wide aperture portion 40 of the channel 38 narrows to the narrow aperture portion that terminates at a closed end 46 at the first end 22, 22' of the respective one of the rails 16, 16'. The closed end 46 is formed a lock mechanism 48 being positioned in the channel 38. The lock mechanism 48 can take many forms, and in the present embodiment of the invention the lock mechanism 48 has spring loaded fingers 50, 50' that resiliently grasp a respective dog post 28, 34 that are located forward of respective dog post 28', 34'.

Figures 3A, 3C:
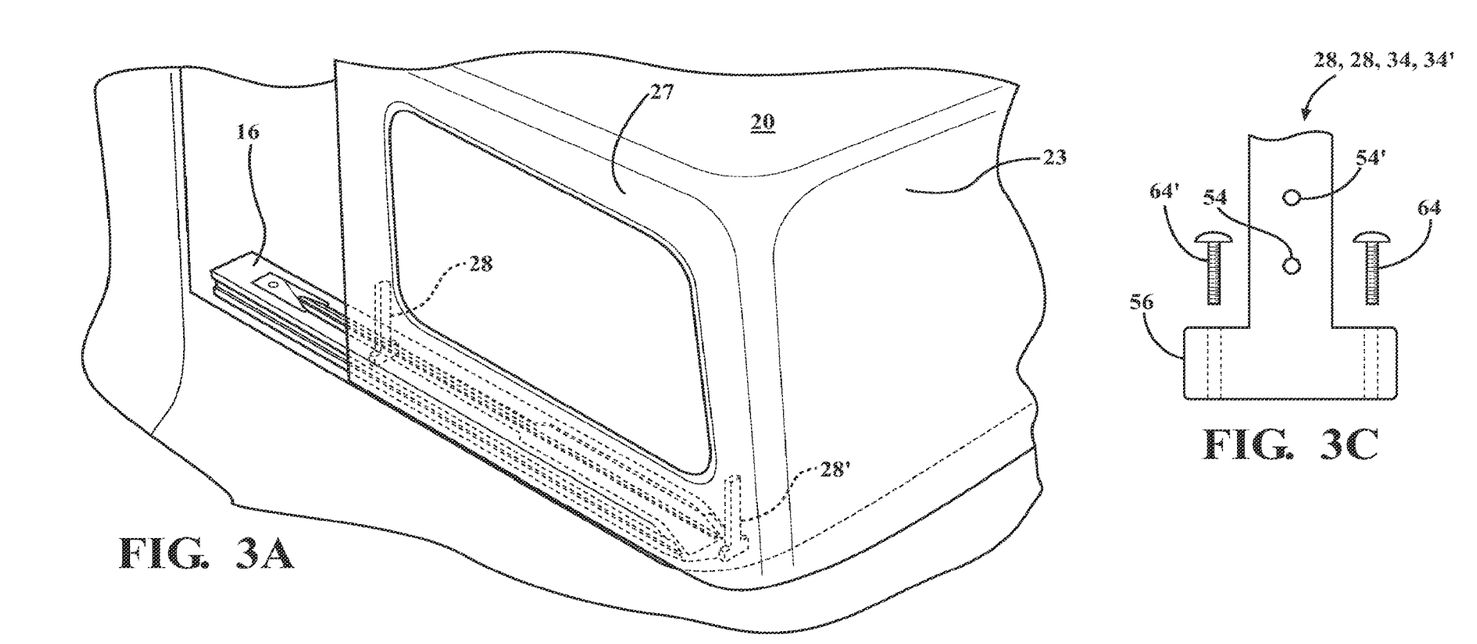
FIG. 3A is an enlarged side elevational view of a portion of the hard top vehicle removal system.
FIG. 3C a partial side elevational view of a dog post of the hardtop removal assist system.

FIG. 3C shows the details of dog post 28, 28', 34, 34' each of which include a neck 52 that is connectable to the hard top 18 using a variety of connection methods. As shown fasteners 54, 54' are extend through the neck 52 and connect to the respective left side 27 or right side 32 of the hard top 18. While fasteners 54, 54' are shown and described it is also within the scope of this invention for the connection to be accomplished using adhesives, welding or integrally forming the dog post 28, 28', 34, 34' as part of the hard top 18 during a forming process. The dog post 28, 28', 34, 34' in one embodiment is formed of steel, aluminum, or alloy, while in the alternative it can be formed of polymer material. The neck 52 of each dog post 28, 28', 34, 34' is connected to a foot 56, which as shown in FIG. 3C has a wider side elevational profile than the neck 52.

Figure 2A:
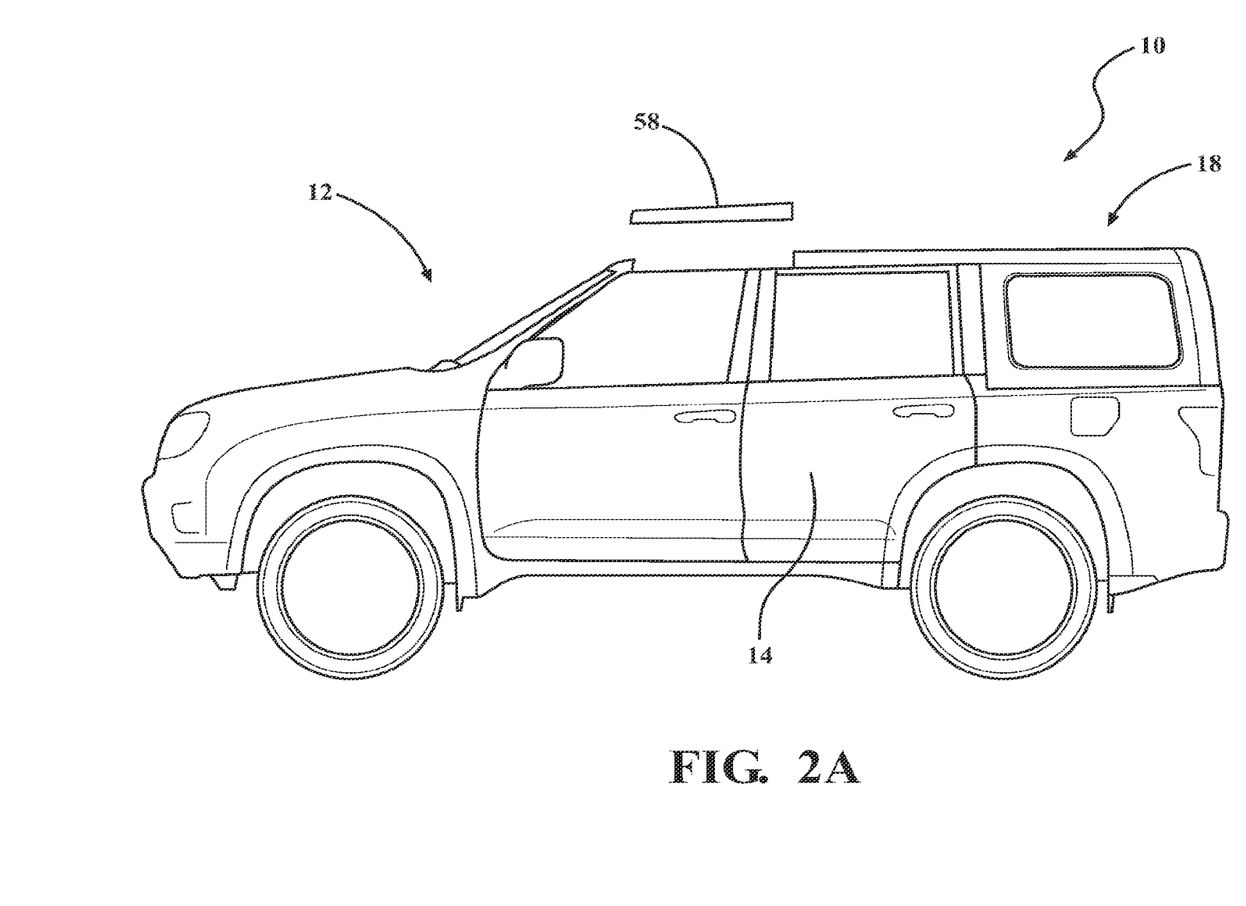
FIG. 2A is a side elevational view of a vehicle with a removable hard top illustrating the steps for removing the hard top.
Figure 2B:
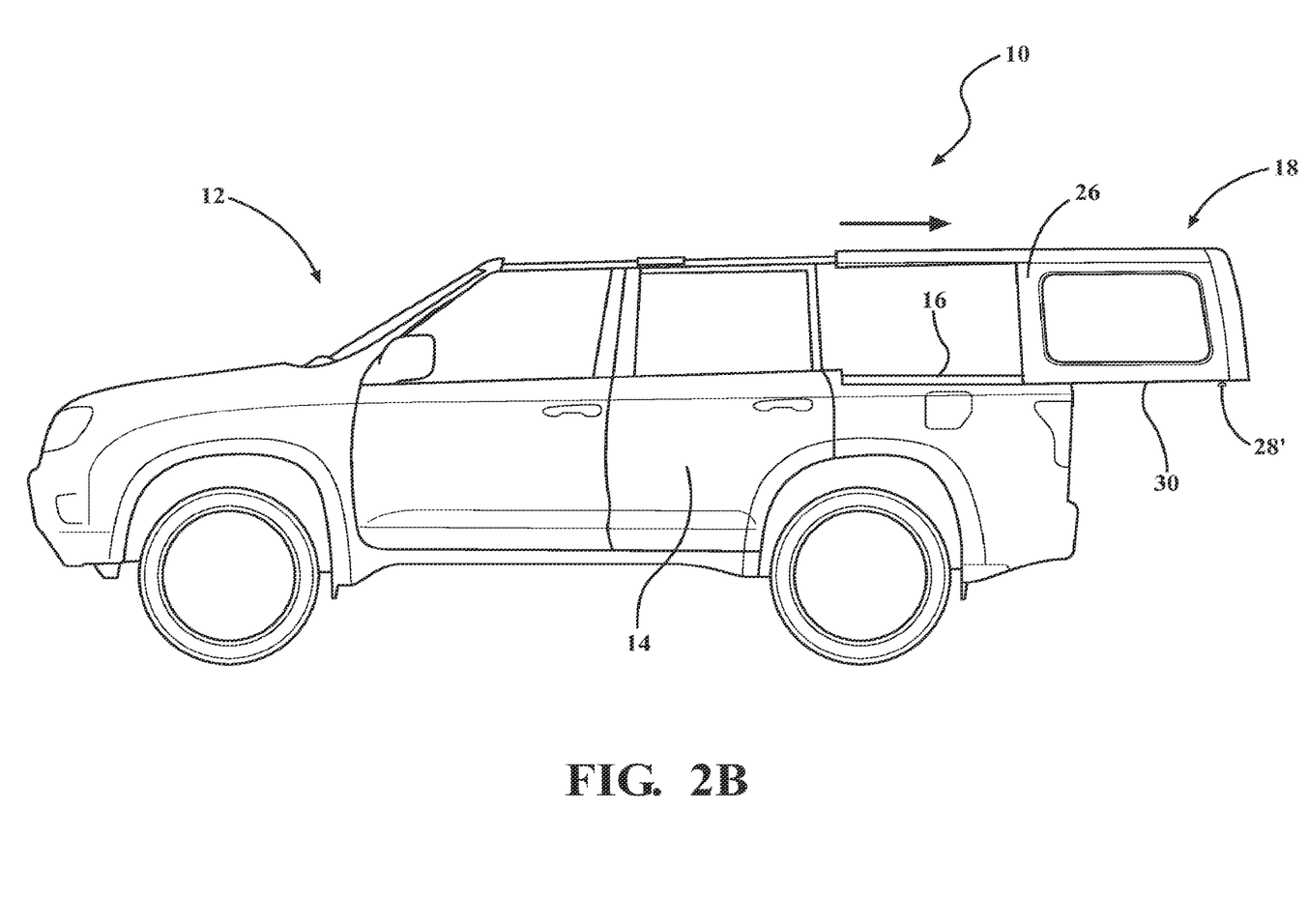
FIG. 2B is a side elevational view of a vehicle with a removable hard top illustrating the steps for removing the hard top.
Figure 2C:
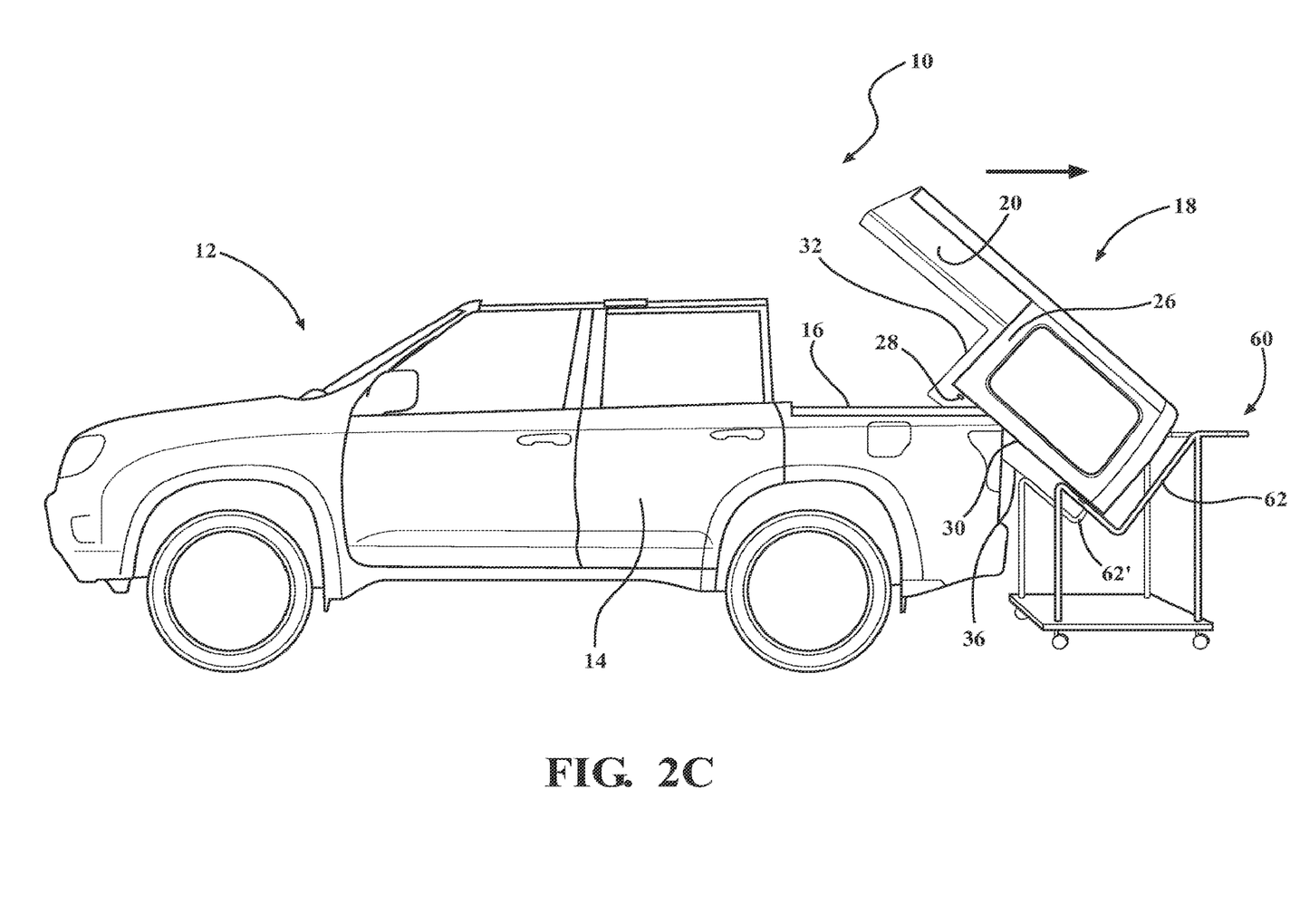
FIG. 2C is a side elevational view of a vehicle with a removable hard top illustrating the steps for removing the hard top.
Figure 2D:
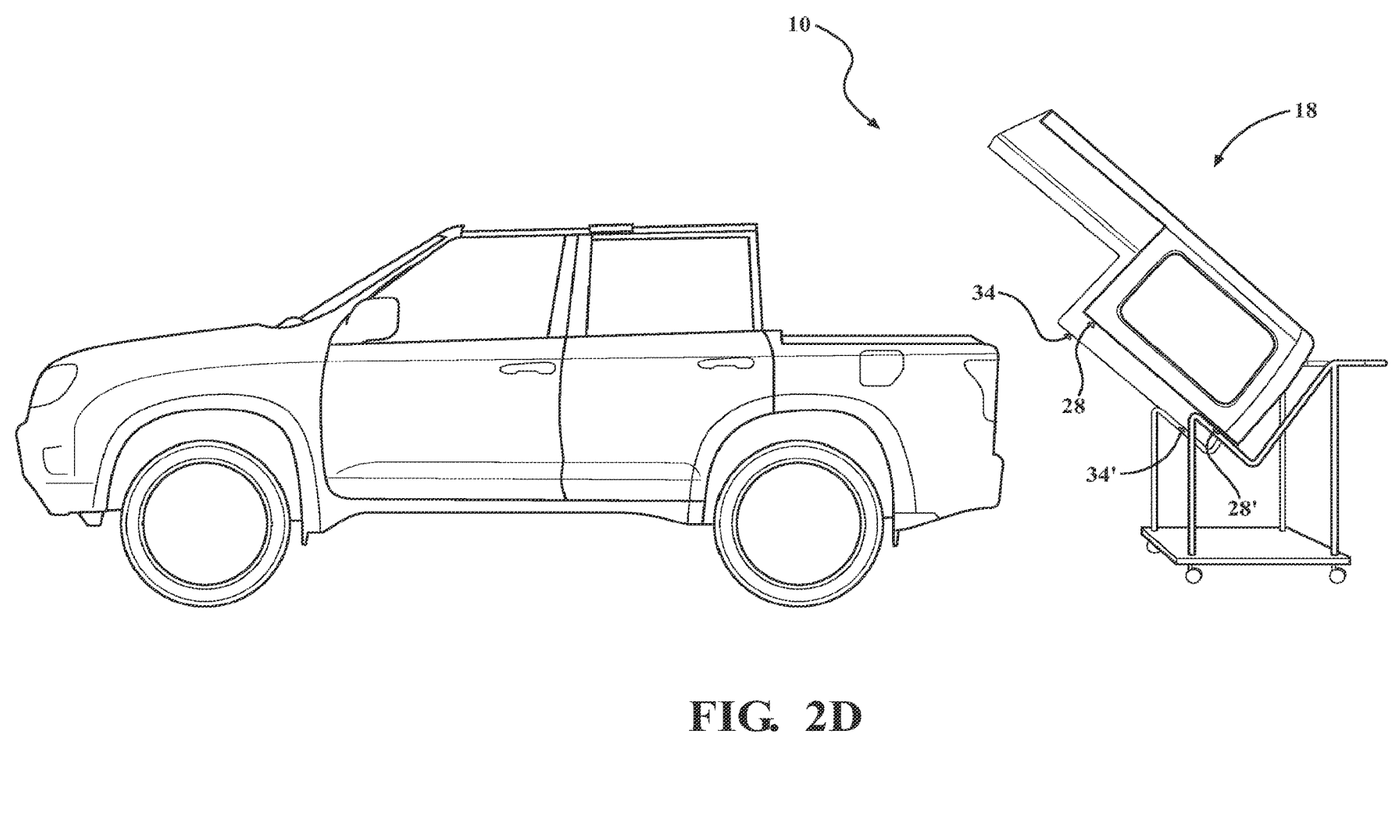
FIG. 2D is a side elevational view of a vehicle with a removable hard top illustrating the steps for removing the hard top.
Figure 3B:
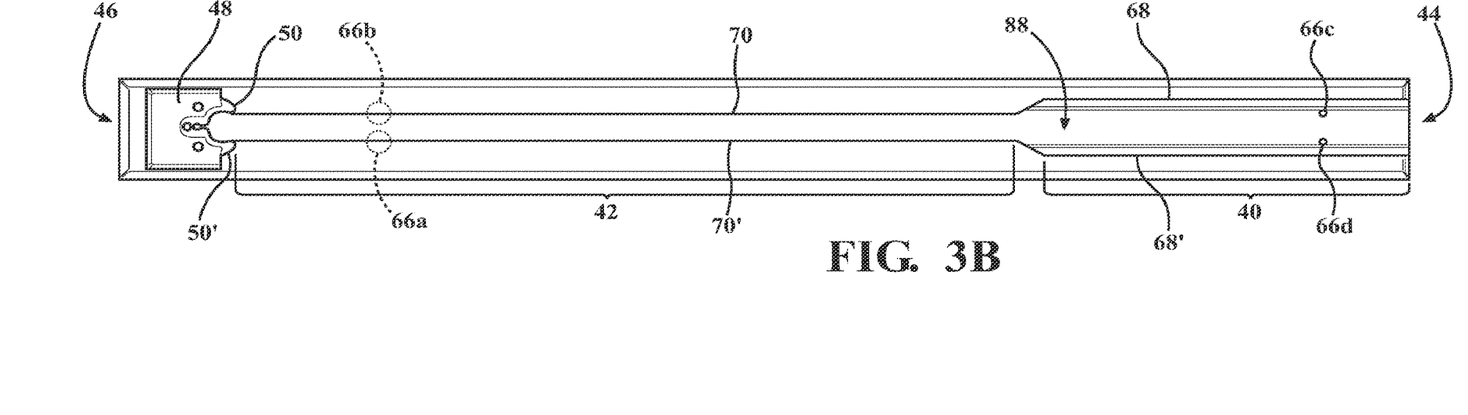
FIG. 3B is a top plan view of a rail portion of the hard top vehicle removal system.

Referring now to FIGS. 2A-2D the steps for removing the hard top 18 from the body 14 of the vehicle 12 using the hard top removal system 10 are shown. It is to be understood the steps for installing the hard top 18 using the hard top removal system 10 are the reverse of what will not be described. In FIG. 2A the hard top 18 is located in the installed position and the lock mechanism 48 is holding the dog posts 28, 34 by grasping the neck 52 using the fingers 50, 50'. The lock mechanism 48 is spring loaded and will release the neck 52 by depressing a release button or by forcibly pulling the dog post 28, 34 from the fingers 50, 50'. In the present embodiment of the invention the hard top removal system 10 has a modular panel 58 that overlaps or rests against the hard top 18. The modular panel 58 is an additional component that is not always present in all embodiments of the invention. The modular panel 58 is typically secured using latches and fastener and lifts off the of a flange or overlap edge of the hard top 18. Also, during these steps, the fasteners and latches that secure the hard top 18 to the vehicle body 14 are removed or released. The use of the fasteners and latches is optional and is sometimes necessary to prevent vibrations between the hard top 18 and the vehicle body. Also as shown in FIGS. 3B, 3C it is within the scope of the invention for fasteners 64, 64' to be placed through the foot 56 of the dog posts 28, 28', 34, 34' into a threaded hole 66a, 66b, 66c, 66d respective hole formed in the channel 38 of each rail 16, 16' to secure the dog posts 28, 28', 34, 34' in place. The use of fasteners 64, 64' and the threaded hole 66a, 66b, 66c, 66d is an optional feature that is not required for every embodiment of the invention.

Figure 4:
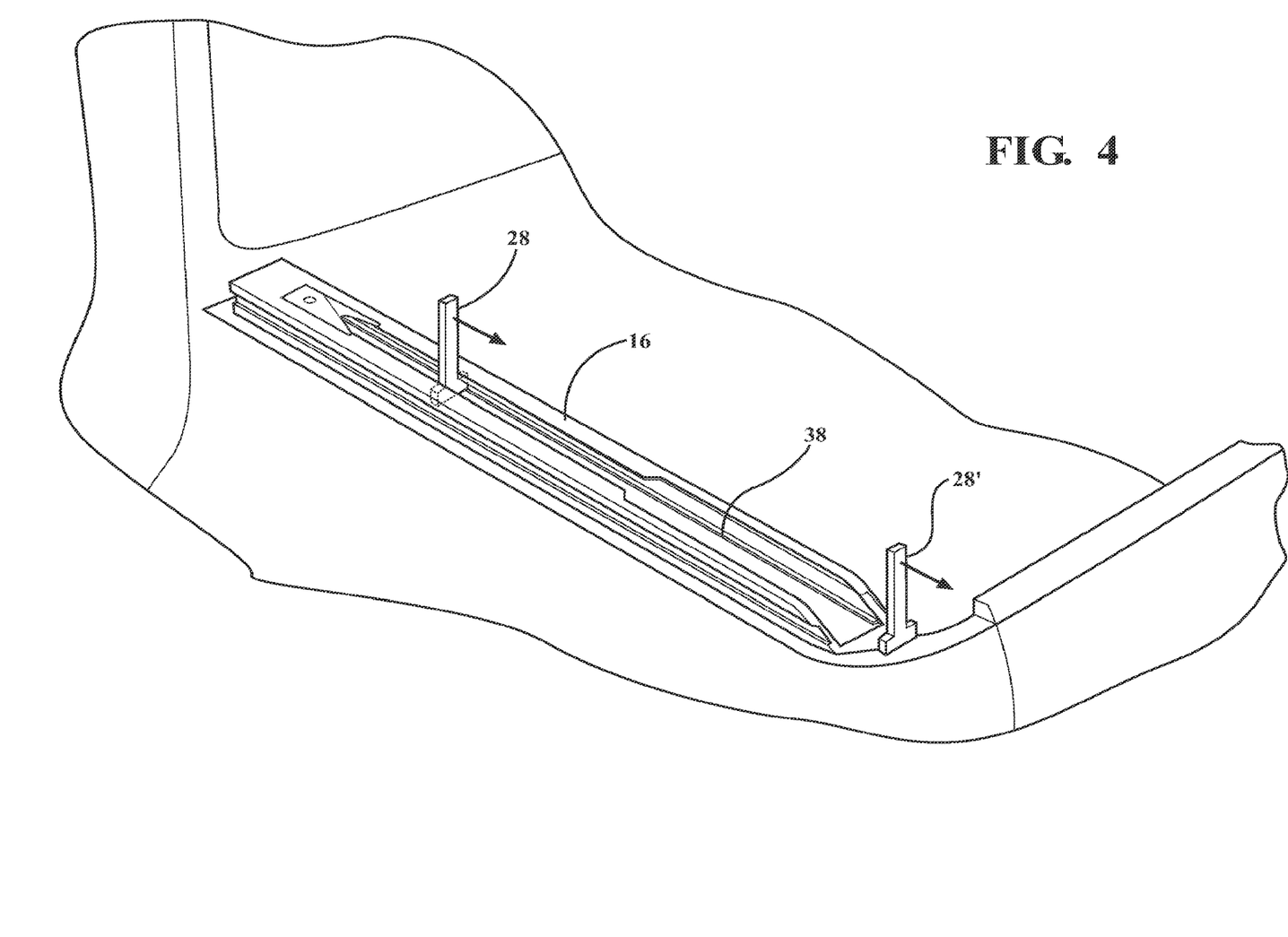
FIG. 4 is an enlarged side elevational view of a portion of the hard top vehicle removal system.

Referring now to FIGS. 3A, 3B and 4 the details of the connection of the dog posts 28, 28', 34, 34' to the respective rails 16, 16' is described with specific reference to the left side 27 of the hard top 18 and the connection between dog posts 28, 28' and rail 16, where it is to be understood that dog posts 34, 34' connect to rail 16' on the right side 32 of the hard top 18 in the same manner. The foot 56 of each dog post 28, 28' slide into the channel 38 of the rail 16 though the open end 44. The neck deck 52 of the dog post 28, 28' extends upward out of the wider aperture portion 40 and narrow aperture portion 42 of the rail 16. The wide aperture portion has edges 68, 68' and the narrow aperture portion 42 has edges 70, 70' that are portioned over the foot 56 and prevent the dog post 28, 28' from sliding vertically out of the channel 38.

During removal or installation of the hard top 18 the left side 27 or right side 32 in an ideal process will be pushed or pulled on the rails 16, 16' at the same time, however, one side might move faster or slower than the other and there is the potential for the hard top 18 to get locked on the rails 16, 16' if the hard top twists about the axis A-A shown in FIG. 1. To mitigate this situation the wide aperture portion 40 of the rails 16, 16' have the wide aperture portion 40 over a section of the length of the rail 16, 16', that transitions to the narrow aperture portion 42. This allow for the neck 52 of the dog post 28, 28', 34, 34' some freedom to shift between edges 68, 68' in the wide aperture portion 40, which allows the hard top 18 to be adjusted and avoid being locked. But when the dog post 28, 28', 34, 34' enters the narrow aperture portion 42 the neck 52 comes into contact with edges 70, 70' of the narrow aperture portion 42 so there is no sideways movement of the hard top when it is in a position that it is connected to the vehicle body 14. When the hard top 18 is connected to the vehicle body 14, the length of the narrow aperture portion 42 is long enough to accommodate all dog posts 28, 28', 34, 34'. However, it is within the scope of this invention for just dog posts 28, 34 to be contained in the narrow aperture portion 42 while dog posts 28', 34' are positioned in the wide aperture portion 40 and then fasteners or clamps are used to secure the dog posts 28', 34' and prevent the neck 52 from moving between the edges 68, 68'.

After the steps described above, at FIG. 2B the hard top 18 slides rearward toward the rear side 24 of the vehicle 12 so that dog posts 28', 34' slide out of the open end 44 of the channel 38 of the respective rail 16, 16'. In FIG. 2C the hard top 18 continues to move rearward and a cart 60 with bow arms 62, 62' is positioned behind the rear side 24 of the vehicle 12. As the hard top 18 is pulled further rearward of the rear side 24 the dog posts 28, 34 slide out of the open end 44 of the channel 38 of their respective rail 16, 16' and the hard top is not disconnected from the rails 16, 16' and the vehicle body 14. The bow arms 62, 62' are contoured to catch and support the rear side 23, left side 27 and right side 32 of the hard top 18 at the dog posts 28, 34 are completely disengaged from the respective rail 16, 16', thereby completely disengaging the hard top 18 from the vehicle body 14. FIG. 2D shows that once the hard top 18 is completely disengaged from the vehicle 12 the cart 60 has wheels that allow the cart 60 with the hard top 18 resting thereon, to be moved to a different location. The hard top removal system 10 according to the present embodiment of the invention allows the hard top 18 to be disconnected and reconnected to the vehicle 12 by a single person since the cart 60 is used to bear the weight of the hard top 18 upon removal, which is typically to heavy and large for a single person to do alone without taking the risk of dropping and damaging the hard top.

FIGS. 2A-2D show the movement of the hard top between the installed position (show in FIG. 2A) and the removed positions (shown in FIGS. 2C and 2D). After removal of any modular panel the user pushes or pulls the hard top 18 so the dog posts 28, 28', 34, 34' slide on the rails. In alternate embodiments of the invention the hard top 18 is moved between the installed position and removed position using an actuator, which will now be described with reference to FIGS. 5-7, where like reference numbers from FIGS. 1-4 are carried forward to FIGS. 5-7 without repetition.

Figure 5:
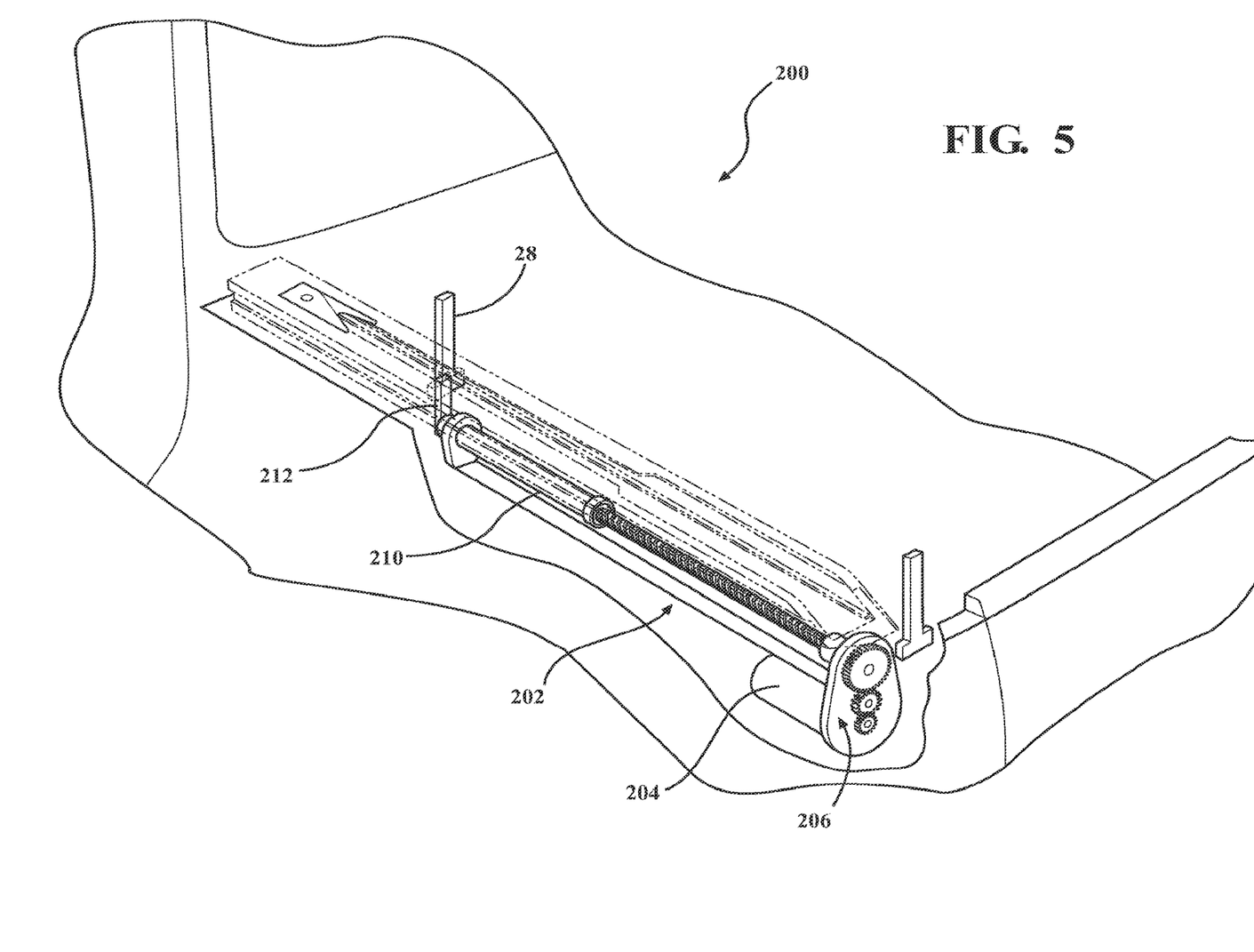
FIG. 5 is an enlarged side elevational view of a portion of an alternate embodiment of the hard top vehicle removal system.

Referring to FIG. 5 a hard top removal assist system 200 that has an actuator 202, that has a motor 204, that rotates a gear train 206 bidirectionally. The gear train 206 is connected to a threaded rod 208 having threads on the outer surface. A cylinder 210 threadably connected to the threaded rod 208 so that when the threaded rod rotates 208 rotates the cylinder 210 threads off the threaded rod 208 and moves in a first direction. When the threaded rod 208 rotates in a second direction, the cylinder 210 moves in a second direction as a portion of the threaded rod 208 moves or threads into the inside of the cylinder 210 causing the cylinder to move in a second direction. Connected to the end of the cylinder 210 is an arm 212 that contacts and pushes or pulls the dog post 28 causing the hard top 18, shown in FIGS. 2A to 2D to move between the installed position or removed position.

Figure 6:
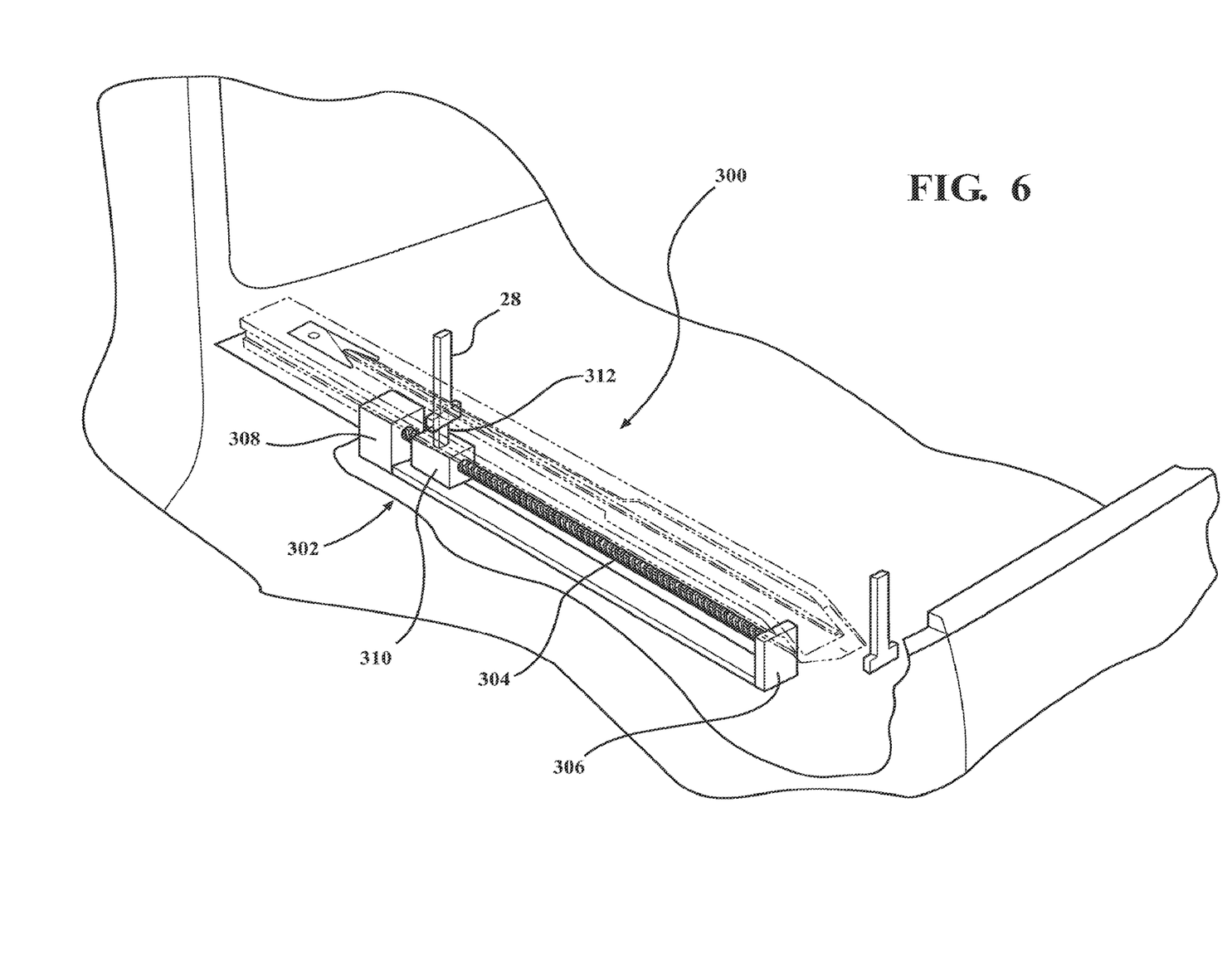
FIG. 6 is an enlarged side elevational view of a portion of an alternate embodiment of the hard top vehicle removal system.

Referring to FIG. 6 a hard top removal assist system 300 is shown having an actuator 302 with a threaded rod 304 connected between two a stationary mount 306 and a motor 308 capable of rotating the threaded rod 304 bidirectionally. The threaded rod 304 has threads on an outer surface. A shuttle 310 is connected to the threads on the outer surface of the threaded rod 304 and moves along the length of the threaded rod 304. When the threaded rod rotates 304 rotates in a first direction the shuttle 310 moves in a first direction along the threads, and when the threaded rod 304 rotates in a second direction the shuttle 310 moves in a second direction along the threads. Connected to the shuttle 310 is an arm 312 that contacts and pushes or pulls the dog post 28 causing the hard top 18, shown in FIGS. 2A to 2D to move between the installed position or removed position. In another aspect of the present embodiment, the shuttle 310 and threaded rod 304 are a ball screw mechanism and the shuttle 310 has bearings that contact the threads of the threaded rod 304 to reduce the friction as the shuttle 310 moves along the length of the threaded rod.

Figure 7:
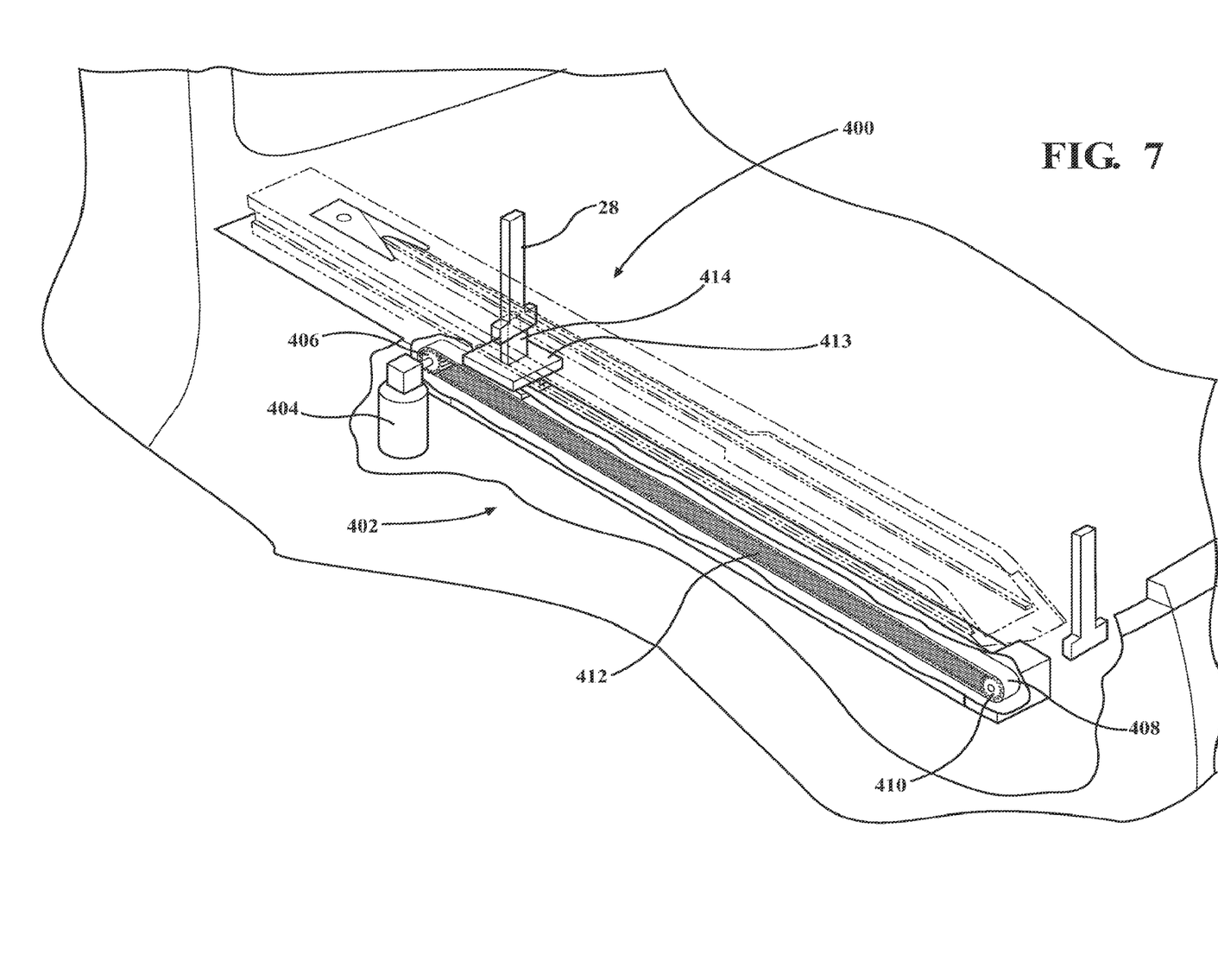
FIG. 7 is an enlarged side elevational view of a portion of an alternate embodiment of the hard top vehicle removal system.

Referring to FIG. 7 a hard top removal assist system 400 that includes an actuator 402 that is a push-pull belt driven actuator. The actuator 402 has a motor 404, that rotates a gear 406 bidirectionally. The gear 406 is connected to a belt 408 rotates between gear 406 and a roller 410. One surface of the belt 408 has teeth 412 that mate with the gear 406 to provide traction for rotating the belt 408. A shuttle 413 is connected to and moves along the length of the belt 408. The shuttle 413 has an arm 414 that contacts and pushes or pulls the dog post 28 causing the hard top 18, shown in FIGS. 2A to 2D to move between the installed position or removed position.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A hard top removal assist system for a vehicle comprising:
   a vehicle body having a plurality of rails mounted to the vehicle body;
   a hard top having at least one connection with each of the plurality of rails mounted to the vehicle body, wherein a first end of the plurality of rails is spaced away at a space distance from a rear side of the vehicle and a second end of the plurality of rails is opposite the first end and is closer to the rear side of the vehicle and the second end of the plurality of rails has an open end that connects to a channel that terminates at a closed end and the at least one connection slides into the channel at the open end of one of the plurality of rails, wherein the at least one connection is slidable in the plurality of rails between an installed position, and a removed position where the hard top can be fully removed from the vehicle body and the plurality of rails;
   wherein the closed end of the channel has a lock mechanism that releasably grasps the at least one connection to hold the hard top in place at an installed position, wherein the lock mechanism has fingers that grasp a neck to hold the hard top in place at the installed position and the lock mechanism releases the at least one connection when the hard top is moved to the removed position and the at least one connection includes a dog post having the neck that connects to the hard top and a foot that is positioned in the channel, and
   wherein each of the plurality of rails has a wide aperture portion that connects to a narrow aperture portion, wherein when the foot of the dog post is positioned in the channel, the neck extends through one of the wide aperture portion and the narrow aperture portion depending on whether the dog post is positioned in the portion of the channel where the wide aperture portion is located or where the narrow aperture portion is located, and
   an actuator having an arm connectable to the dog post for moving the dog post and the hard top between the installed position and the removed position.

2. The hard top removal assist system for a vehicle of claim 1 wherein the plurality of rails extend parallel to a longitudinal axis of the vehicle.

3. The hard top removal assist system for a vehicle of claim 1 further comprising a cart having bow arms shaped to receive and support the hard top as the hard top moves past a rear side of the vehicle to a removed position.

4. The hard top removal assist system of claim 1 wherein the actuator includes:
   a motor;
   a gear train connected to the motor, wherein the motor is capable to rotating the gear train bidirectionally;
   a threaded rod connected to and rotatable with the gear train;
   a cylinder connected to the threads of the threaded rod, wherein the threads of the threaded rod extend inside of the cylinder so that when the threaded rod rotates in a first direction the cylinder moves so that the threads move off of the cylinder and when the threaded rod rotates in second direction the threads move into the cylinder; and
   wherein the arm extends from the cylinder.

5. The hard top removal assist system of claim 1 wherein the actuator includes:
   a threaded rod having threads on the outer surface, the threaded rod being connected between a stationary mount and a motor capable of rotating the threaded rod bidirectionally;
   a shuttle connectable to the threads of the threaded rod, wherein the shuttle is movable along the length of the threaded rod and when the threaded rod rotates in a first direction the shuttle moves in a first direction, and when the threaded rod rotates in a second direction the shuttle moves in a second direction;
   wherein the arm is connected to the shuttle and pushes or pulls the dog post causing the hard top to move between the installed position or removed position.

6. The hard top removal assist system of claim 1 wherein the actuator includes:
   a motor, that rotates a gear bidirectionally;
   a belt connected between the gear and a roller, wherein one surface of the belt has teeth that mate with teeth formed on the gear, wherein the teeth of the belt provide traction for rotating the belt;

a shuttle connected to and moveable with the belt, wherein the arm is connected to the shuttle and the arm contacts and pushes or pulls the dog post causing the hard top to move between the installed position or removed position.

7. The hard top removal assist system of claim 1 wherein further comprising the actuator connectable to the at least one connection for moving the hard top and the at least one connection between the installed position and the removed position.

8. A hard top removal assist system for a vehicle comprising:

a vehicle body having a plurality of rails mounted to the vehicle body;

a hard top having at least one connection with each of the plurality of rails mounted to the vehicle body, wherein a first end of the plurality of rails is spaced away at a space distance from a rear side of the vehicle and a second end of the plurality of rails is opposite the first and closer to the rear side of the vehicle and the second end of the plurality of rails has an open end that connect to a channel that terminates at a closed end and the at least one connection slides into the channel at the open end of one of the plurality of rails, wherein the at least one connection is slidable in the plurality of rails between an installed position, and a removed position where the hard top can be fully removed from the vehicle body and the plurality of rails;

wherein the closed end of the channel has a lock mechanism that releasably grasps the at least one connection to hold the hard top in place at an installed position, wherein the lock mechanism has fingers that grasp a neck to hold the hard top in place at the installed position and the lock mechanism releases the at least one connection when the hard top is moved to the removed position and the at least one connection includes a dog post having the neck that connects to the hard top and a foot that is positioned in the channel;

wherein each of the plurality of rails has a wide aperture portion that connects to a narrow aperture portion, wherein when the foot of the dog post is positioned in the channel, the neck extends through one of the wide aperture portion and the narrow aperture portion depending on whether the dog post is positioned in the portion of the channel where the wide aperture portion is located or where the narrow aperture portion is located;

an actuator having an arm connectable to the dog post for moving the dog post and the hard top between the installed position and the removed position, and a cart having bow arms shaped to receive and support the hard top as the hard top moves past a rear side of the vehicle to a removed position.

9. The hard top removal assist system for a vehicle of claim 8 wherein the plurality of rails extend parallel to a longitudinal axis of the vehicle.

10. The hard top removal assist system of claim 8 wherein the actuator includes:

a motor;

a gear train connected to the motor, wherein the motor is capable to rotating the gear train bidirectionally;

a threaded rod connected to and rotatable with the gear train;

a cylinder connected to the threads of the threaded rod, wherein the threads of the threaded rod extend inside of the cylinder so that when the threaded rod rotates in a first direction the cylinder moves so that the threads move off of the cylinder and when the threaded rod rotates in second direction the threads move into the cylinder; and wherein the arm extends from the cylinder.

11. The hard top removal assist system of claim 8 wherein the actuator includes:

a threaded rod having threads on the outer surface, the threaded rod being connected between a stationary mount and a motor capable of rotating the threaded rod bidirectionally;

a shuttle connectable to the threads of the threaded rod, wherein the shuttle is movable along the length of the threaded rod and when the threaded rod rotates in a first direction the shuttle moves in a first direction, and when the threaded rod rotates in a second direction the shuttle moves in a second direction;

wherein the arm is connected to the shuttle and pushes or pulls the dog post causing the hard top to move between the installed position or removed position.

12. The hard top removal assist system of claim 8 wherein the actuator includes:

a motor, that rotates a gear bidirectionally;

a belt connected between the gear and a roller, wherein one surface of the belt has teeth that mate with teeth formed on the gear, wherein the teeth of the belt provide traction for rotating the belt;

a shuttle connected to and moveable with the belt, wherein the arm is connected to the shuttle and the arm contacts and pushes or pulls the dog post causing the hard top to move between the installed position or removed position.

13. The hard top removal assist system of claim 8 wherein further comprising the actuator connectable to the at least one connection for moving the hard top and the at least one connection between the installed position and the removed position.

* * * * *